(12) United States Patent
Ichikawa

(10) Patent No.: US 9,334,427 B2
(45) Date of Patent: May 10, 2016

(54) PUNCTURE SEALING AGENT

(71) Applicant: SUMITOMO RUBBER INDUSTRIES, LTD., Kobe-shi, Hyogo (JP)

(72) Inventor: Naoya Ichikawa, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/410,242

(22) PCT Filed: Jun. 26, 2013

(86) PCT No.: PCT/JP2013/067440
§ 371 (c)(1),
(2) Date: Dec. 22, 2014

(87) PCT Pub. No.: WO2014/003031
PCT Pub. Date: Jan. 3, 2014

(65) Prior Publication Data
US 2015/0344743 A1 Dec. 3, 2015

(30) Foreign Application Priority Data

Jun. 27, 2012 (JP) ................................ 2012-144519

(51) Int. Cl.
| C08K 3/02 | (2006.01) |
| B29C 73/22 | (2006.01) |
| C09J 109/08 | (2006.01) |
| C09J 107/02 | (2006.01) |
| C08K 5/053 | (2006.01) |
| C08K 3/36 | (2006.01) |
| C08K 5/00 | (2006.01) |
| C08K 3/00 | (2006.01) |
| B29C 73/16 | (2006.01) |

(52) U.S. Cl.
CPC ............. *C09J 109/08* (2013.01); *B29C 73/163* (2013.01); *C08K 3/0008* (2013.01); *C08K 3/36* (2013.01); *C08K 5/0008* (2013.01); *C08K 5/053* (2013.01); *C09J 107/02* (2013.01)

(58) Field of Classification Search
CPC ........ C09J 109/08; C09J 107/02; C08K 3/36; C08K 5/0008; C08K 5/053; C08K 3/0008
USPC .......................................................... 524/80
See application file for complete search history.

(56) References Cited

U.S. PATENT DOCUMENTS

| 4,116,895 A | 9/1978 | Kageyama et al. |
| 6,176,285 B1 * | 1/2001 | Gerresheim .......... B29C 73/163 152/509 |
| 2002/0121331 A1 | 9/2002 | Gerresheim et al. |
| 2006/0142420 A1 | 6/2006 | Nakazawa et al. |
| 2011/0144237 A1 * | 6/2011 | Takahara .................. C08L 7/00 523/166 |
| 2012/0309867 A1 | 12/2012 | Takahara |

FOREIGN PATENT DOCUMENTS

| CN | 1717465 A | | 1/2006 |
| JP | 52-148544 A | | 12/1977 |
| JP | 53-138111 A | | 12/1978 |
| JP | 54-8307 A | | 1/1979 |
| JP | 54008307 | * | 1/1979 |
| JP | 9-118779 A | | 5/1997 |
| JP | 2000-272022 A | | 10/2000 |
| JP | 2001-198986 A | | 7/2001 |
| JP | 2002-294214 A | | 10/2002 |
| JP | 2002294214 A | * | 10/2002 |
| JP | 2011-006645 A | | 1/2011 |
| JP | 2011-012158 A | | 1/2011 |
| JP | 2013-10840 A | | 1/2013 |
| JP | 2013-010840 A | | 1/2013 |
| WO | WO 2011/096491 A1 | | 8/2011 |

OTHER PUBLICATIONS

International Search Report issued in PCT/JP2013/067440, dated Oct. 1, 2013.

* cited by examiner

*Primary Examiner* — Hui Chin
(74) *Attorney, Agent, or Firm* — Birch, Stewart, Kolasch & Birch, LLP

(57) ABSTRACT

The present invention provides a puncture sealant for tires capable of achieving improved injectability while having excellent initial sealing performance and seal retention performance. The puncture sealant includes rubber latex, a tackifier, an antifreezing agent, and a thixotropy-imparting agent.

10 Claims, No Drawings

PUNCTURE SEALING AGENT

TECHNICAL FIELD

The present invention relates to a puncture sealant for use in puncture repair systems in which when a tire is punctured, a puncture sealant and high-pressure air are sequentially injected into the tire through an air valve on the tire wheel.

BACKGROUND ART

Systems for temporarily repairing a punctured tire are known, such as, for example, those which include a pressure-proof container containing a puncture sealant, and a high pressure air source such as a compressor, to inject the sealant into a tire through the air valve and then continuously inject high-pressure air until the tire is pumped up to a sufficient pressure for driving (hereinafter referred to also as "integrated systems"). Puncture sealants that include natural rubber latex in combination with a resin tackifier and an antifreezing agent as described in Patent Literatures 1 to 5, and the like have been proposed as such puncture sealants.

Puncture sealants for use in integrated systems usually need to have puncture sealing performance, seal retention performance, injectability, storage stability, and other properties. For example, from the viewpoint of injectability, less viscous puncture sealants have been developed to ensure this property.

Such puncture sealants adjusted to have low viscosity can be injected into a tire in a shorter period of time; however, in sealing a puncture, the liquid sealants tend not to remain in the punctured part but to easily flow off, which may result in reduced puncture sealing performance. As described above, it is usually difficult to facilitate injection of a puncture sealant while enhancing its puncture sealing performance and, at the same time, to ensure seal retention performance. Thus, puncture sealants that can achieve balanced improvements in these properties are desired.

CITATION LIST

Patent Literature

Patent Literature 1: JP 2000-272022 A
Patent Literature 2: JP 2001-198986 A
Patent Literature 3: JP 2002-294214 A
Patent Literature 4: JP 2011-006645 A
Patent Literature 5: JP 2011-012158 A

SUMMARY OF INVENTION

Technical Problem

The present invention aims to solve the above problems and provide a puncture sealant for tires capable of achieving improved injectability while having excellent initial sealing performance and seal retention performance.

Solution to Problem

The present invention relates to a puncture sealant, including: rubber latex, a tackifier, an antifreezing agent, and a thixotropy-imparting agent.

The thixotropy-imparting agent is preferably at least one of a water-soluble polymer and inorganic particles.

The puncture sealant preferably has a thixotropic index (TI) of 1.5 or more as measured at a low rotational speed of 6 rpm and a high rotational speed of 60 rpm.

Moreover, the puncture sealant preferably has a viscosity at 20° C. of 200 cps or less.

Advantageous Effects of Invention

The puncture sealant of the present invention includes a thixotropy-imparting agent in addition to rubber latex, a tackifier, and an antifreezing agent. Thus, it can achieve improved injectability while having excellent initial sealing performance and seal retention performance.

DESCRIPTION OF EMBODIMENTS

The puncture sealant of the present invention includes rubber latex, a tackifier, an antifreezing agent, and a thixotropy-imparting agent. The puncture sealant having thixotropic properties imparted thereto, on the one hand, is less vicious when it is pumped at a high speed through the valve core, and, on the other hand, is less likely to flow after injected into the tire, thereby achieving good sealing performance. Thus, the puncture sealant can provide both injectability into a tire and initial sealing performance and, at the same time, achieve excellent seal retention performance.

Moreover, although the puncture sealant of the present invention includes a thixotropy-imparting agent as mentioned above, it also has excellent storage stability.

Examples of the rubber latex include natural rubber latex and synthetic rubber latex. In particular, the puncture sealant may suitably include natural rubber latex as a main component in view of the following properties: for example, the puncture sealant can be injected into a tire without clogging the valve; the puncture sealant is allowed to rapidly fill a puncture hole by driving and then solidified by receiving mechanical stimuli due to the deformation of the tire, so as to seal the puncture hole (initial sealing performance); and the puncture sealant can maintain sealing performance up to a certain travel distance (seal retention performance).

In particular, so-called deproteinized natural rubber latex, which is obtained by deproteinizing such natural rubber latex, may be more preferably used in view of the additional fact that deproteinized natural rubber latex can be prevented from decaying with a smaller amount of ammonia, and therefore corrosion damage to steel cords and generation of a pungent odor, both caused by ammonia, can be prevented. The deproteinized natural rubber latex may be prepared for example by adding a proteolytic enzyme to natural rubber latex to degrade the proteins, followed by washing, as described in JP-A H10-217344.

Examples also include as synthetic rubber latex, on the other hand, polybutadiene rubber, styrene-butadiene rubber, acrylonitrile-butadiene rubber, ethylene-vinyl acetate rubber, chloroprene rubber, vinyl pyridine rubber, and butyl rubber, and modified rubber latexes thereof. The natural rubber latexes and synthetic rubber latexes may be used alone, or two or more types thereof may be used in combination.

The rubber latex is one in which fine particles of rubber solids are emulsified and dispersed in an aqueous medium containing a small amount of surfactant as an emulsifier. The rubber latex to be used is usually adjusted to have a rubber solids content of approximately 50-60% by mass. Moreover, the amount A of the rubber latex (rubber solids) per total mass (100% by mass) of the puncture sealant is preferably in the range of 10 to 40% by mass from the viewpoints of initial sealing performance and seal retention performance. The lower limit of the amount A is more preferably 20% by mass or more, while the upper limit thereof is more preferably 35% by mass or less.

The tackifier is used to increase adhesion between the rubber latex and a tire and thereby improve puncture sealing performance. For example, a tackifying resin emulsion (oil-in-water emulsion) may be used in which fine particles of a tackifying resin are emulsified and dispersed in an aqueous medium containing a small amount of emulsifier. The tackifying resin to be used as the solids of the tackifying resin emulsion (tackifier) may preferably be one that does not coagulate the rubber latex, such as terpene resin, phenolic resin, or rosin resin.

The amount B of the tackifying resin (the solids in the tackifier) per total mass (100% by mass) of the puncture sealant is preferably 2 to 20% by mass. The lower limit of the amount B is more preferably 3% by mass or more, while the upper limit thereof is more preferably 15% by mass or less.

If the amount A of the rubber solids or the amount B of the tackifying resin is less than the lower limit, the resulting puncture sealant may have insufficient puncture sealing performance and seal retention performance. Conversely, if the amount A or B is more than the upper limit, the resulting puncture sealant may have deteriorated storage properties because, for example, the rubber particles are likely to aggregate during storage; in addition, the puncture sealant may have deteriorated injectability through the air valve due to the increase in viscosity. In consideration of the above, the amount of solids, i.e., the sum of the amount A and the amount B (A+B (solids)), per total mass (100% by mass) of the puncture sealant is preferably 20% by mass or more, and more preferably 25% by mass or more. If the amount of solids is less than 20% by mass, the resulting puncture sealant may have insufficient puncture sealing performance and seal retention performance. The amount of solids (the amounts A+B (solids)) is preferably 50% by mass or less, and more preferably 45% by mass or less. If the amount of solids is more than 50% by mass, the resulting puncture sealant is more viscous and thus has deteriorated injectability particularly at low temperatures.

Suitable examples of the emulsifiers for the rubber latex and for the tackifying resin emulsion include surfactants such as anionic surfactants, nonionic surfactants, and cationic surfactants. The combined amount of these emulsifiers per total mass (100% by mass) of the puncture sealant is approximately 0.4-2.0% by mass.

The antifreezing agent to be used in the present invention is not particularly limited, and examples thereof include ethylene glycol, propylene glycol (1,2-propanediol), and 1,3-propanediol. Propylene glycol and 1,3-propanediol are especially preferred as they provide excellent storage properties (storage stability). Moreover, an increase in viscosity at temperatures as low as $-30°$ C. or lower can be suppressed so that injectability at low temperatures can be ensured.

The amount C of the antifreezing agent per total mass (100% by mass) of the puncture sealant is preferably 20 to 65% by mass. If the amount C is less than 20% by mass, the resulting puncture sealant may show a greater increase in viscosity at low temperatures. Conversely, if the amount C is more than 65% by mass, the puncture sealant has a reduced solids content and thus may have lower sealing performance. The lower limit of the amount C is more preferably 25% by mass or more, while the upper limit thereof is more preferably 60% by mass or less.

The present invention involves the addition of a thixotropy-imparting agent. Thixotropy as used herein means that viscosity varies with changes in shear force. Specifically, viscosity is gradually reduced with continuously applied shear force, and viscosity is gradually increased after rest.

The thixotropy-imparting agent is not particularly limited, as long as it has the properties of imparting thixotropy, and examples thereof include water-soluble polymers, such as polyethylene glycol, polypropylene glycol, polyethylene oxide, methyl cellulose, ethyl cellulose, or hydroxyethyl cellulose; inorganic particles, such as silica particles (e.g. fumed silica, colloidal silica), kaolin particles, montmorillonite, or colloidal alumina; polyolefin-based wax, such as castor wax (hardened castor oil); fatty acid amides, such as m-xylylene bisstearic acid amide; substituted urea wax, such as N-butyl-N'-stearyl urea; and short polyethylene fibers and short phenolic resin fibers. Preferred among these are inorganic particles and water-soluble polymers. In particular, inorganic colloidal particles are more preferred as they do not greatly increase the viscosity of the entire puncture sealant, and thus allow both injectability and initial sealing performance to be achieved.

Colloidal silica, such as colloidal silica having an average particle size of 3 to 100 nm, may suitably be used as the inorganic colloidal particles. The average particle size of colloidal silica refers to a BET particle size which is determined by measuring the specific surface area by a nitrogen adsorption method (BET method), followed by calculation as spherical particles from the measured specific surface area. The average particle size (D nm) can be determined from a specific surface area S ($m^2$/g) and a true specific gravity d (g/$cm^3$) according to the formula: $D=6000/(S\times d)$.

When the colloidal silica has an average particle size in the range of 3 to 100 nm, it disperses well in the puncture sealant, thereby contributing to balanced improvements in initial sealing performance, seal retention performance, and injectability. More preferably, the lower limit of the average particle size of colloidal silica is 7 nm or more, while the upper limit thereof is 50 nm or less.

Examples of the colloidal silica include colloidal silica powder, such as precipitated silica powder or vapor phase silica powder. Especially suitable are colloidal silica sols in which even primary particles of silica are stably dispersed in a medium. The colloidal silica sol (stable suspension of colloidal silica particles) may be either an aqueous silica sol or an organo silica sol. For stable dispersion, the use of an aqueous silica sol is more preferred. In general, colloidal silica sols containing silica in a concentration of 5 to 50% by mass are easily available commercially.

Examples of known aqueous silica sols as stable aqueous suspensions include sodium-stabilized colloidal silica, ammonia-stabilized colloidal silica, and acid-stabilized colloidal silica. In particular, in view of the stability of the puncture sealant, ammonia-stabilized colloidal silica and sodium-stabilized colloidal silica are preferred.

Mention may be made of "SNOWTEX series" produced by Nissan Chemical Industries, Ltd., including: SNOWTEX (Registered Trademark) XS (average particle size: 4 nm), S (average particle size: 9 nm), 30 (average particle size: 12 nm), 50 (average particle size: 21 nm), XL (average particle size: 45 nm), YL (average particle size: 65 nm), ZL (average particle size: 85 nm) and the like as sodium-stabilized colloidal silica; SNOWTEX (Registered Trademark) NXS (average particle size: 4 nm), NS (average particle size: 9 nm), N (average particle size: 12 nm), N-40 (average particle size: 21 nm) and the like as ammonia-stabilized colloidal silica; and SNOWTEX (Registered Trademark) OXS (average particle size: 4 nm), OS (average particle size: 9 nm), O (average particle size: 12 nm), O-40 (average particle size: 21 nm) and the like as acid-stabilized colloidal silica.

Examples of known organo silica sols (organic solvent dispersions of colloidal silica) include a methanol dispersion of colloidal silica and an isopropanol dispersions of colloidal silica, such as, for example: MA-ST (average particle size: 12 nm) as the methanol dispersion type and IPA-ST (average particle size: 12 nm) as the isopropanol dispersion type, both of which are produced by Nissan Chemical Industries, Ltd.

Examples of the water-soluble polymers include: acrylic resins such as polyacrylamide, polyacrylic acid, modified polyacrylic acids, and modified sodium polyacrylates; polyether resins such as pluronic polyether, polyether dialkyl esters, polyether dialkyl ethers, and epoxy modified polyethers; urethane modified polyether resins; polyamido resins such as polyamidoamine salts; cellulose derivatives, such as carboxymethyl cellulose, methyl cellulose, ethyl cellulose, or hydroxyethyl cellulose; and polyvinyl resins, such as polyvinyl alcohol, polyvinyl pyrrolidone, or polyvinyl benzyl ether copolymer. Acrylic resins are suitable among these. Such water-soluble polymers are commercially available, such as, for example, "SN-THICKENER" series (produced by San Nopco Limited).

The amount D of the thixotropy-imparting agent (solids) per total mass (100% by mass) of the puncture sealant is preferably 1 to 30% by mass. If the amount D is less than 1% by mass, the effects of improving injectability and puncture sealing performance tend to be insufficient. Conversely, if the amount D is more than 30% by mass, puncture sealing performance and storage stability may be reduced. The lower limit of the amount D is more preferably 3% by mass or more, while the upper limit thereof is more preferably 20% by mass or less.

The puncture sealant of the present invention may contain a surfactant to enhance stability. Examples of the surfactants include anionic surfactants, nonionic surfactants, and amphoteric surfactants. Nonionic surfactants are especially preferred in view of injectability.

The nonionic surfactant may suitably be, for example, a polyoxyalkylene alkyl ether and/or a polyoxyalkylene alkenyl ether.

The nonionic surfactant, such as polyoxyalkylene alkyl ether or polyoxyalkylene alkenyl ether, preferably has an ethylene oxide structure and/or a propylene oxide structure. Moreover, in the nonionic surfactant having such a structure, the average number of moles of added ethylene oxide (EO) and propylene oxide (PO) (the sum of the average numbers of moles of added EO and PO) is preferably 10 or more, and more preferably 13 or more. Also, the average number of moles is preferably 80 or less, more preferably 60 or less, and still more preferably 40 or less.

The number of carbon atoms in the alkyl group in the polyoxyalkylene alkyl ether, and the number of carbon atoms in the alkenyl group in the polyoxyalkylene alkenyl ether each are preferably 10 or more, and more preferably 12 or more. Also, the numbers of carbon atoms are each preferably 20 or less, and more preferably 18 or less.

Examples of the polyoxyalkylene alkyl ethers and of the polyoxyalkylene alkenyl ethers include compounds represented by the following formula (1):

$$R^1\text{—O—}(AO)_n\text{—H} \quad (1)$$ 

wherein $R^1$ represents a C4-C24 alkyl group or a C4-C24 alkenyl group; the average number n of moles of added AO is 1 to 80; and each AO may be the same as or different from one another and represents a C2-C4 oxyalkylene group.

$R^1$ preferably has 8 or more carbon atoms, more preferably has 10 or more carbon atoms, and still more preferably has 12 or more carbon atoms, whereas it preferably has 22 or less carbon atoms, more preferably has 20 or less carbon atoms, and still more preferably has 18 or less carbon atoms. The average number n is preferably 10 or more, more preferably 13 or more, whereas it is preferably 60 or less, more preferably 50 or less, still more preferably 40 or less.

AO is preferably a C2-C3 oxyalkylene group (an oxyethylene group (EO) or oxypropylene group (PO)). In the case that the $(AO)_n$ includes two or more types of oxyalkylene groups, the oxyalkylene groups may be arranged blockwise or randomly.

Suitable examples of the polyoxyalkylene alkyl ethers and of the polyoxyalkylene alkenyl ethers include compounds represented by the following formula (2):

$$R^2\text{—O—}(EO)_x(PO)_y\text{—H} \quad (2)$$ 

wherein $R^2$ represents a C8-C22 alkyl group or a C8-C22 alkenyl group; EO represents an oxyethylene group; PO represents an oxypropylene group; the average number x of moles of added EO is 1 to 60; and the average number y of moles of added PO is 0 to 20.

The number of carbon atoms in $R^2$ is preferably as mentioned above for $R^1$. $R^2$ may be either linear or branched and is preferably a linear alkyl or alkenyl group. Preferably, x is 10 or more, more preferably 13 or more, whereas it is preferably 50 or less, more preferably 40 or less. Preferably, y is 10 or less, more preferably 4. 5 or less, and still more preferably 2.0 or less, and may be 0.

Examples of the polyoxyalkylene alkyl ethers and of the polyoxyalkylene alkenyl ethers include polyoxyethylene stearyl ether, polyoxyethylene oleyl ether, polyoxyethylene cetyl ether, polyoxyethylene myristyl ether, polyoxyethylene lauryl ether, polyoxyethylene polyoxypropylene stearyl ether, polyoxyethylene polyoxypropylene oleyl ether, polyoxyethylene polyoxypropylene cetyl ether, polyoxyethylene polyoxypropylene myristyl ether, and polyoxyethylene polyoxypropylene lauryl ether. In view of injectability, polyoxyethylene stearyl ether, polyoxyethylene oleyl ether, and polyoxyethylene lauryl ether are especially preferred.

The nonionic surfactant, such as polyoxyalkylene alkyl ether or polyoxyalkylene alkenyl ether, preferably has a hydrophilic-lipophilic balance (HLB) value (calculated by Griffin's method) of 12 or more, more preferably 13 or more. The HLB value is also preferably 19 or less, and more preferably 17 or less. In these cases, compatibility can be enhanced and stability can be improved, which can result in improved storage properties and improved injectability. Additionally, excellent puncture sealing performance (initial sealing performance) and seal retention performance can be achieved.

The amount E of surfactant per total mass (100% by mass) of the puncture sealant is preferably 1 to 12% by mass. If the amount E is less than 1% by mass, the resulting puncture sealant may not show a sufficient clogging-prevention effect. Conversely, if the amount E exceeds 12% by mass, the resulting puncture sealant may have insufficient sealing properties and may also be more viscous at room temperature. The lower limit of the amount E is more preferably 1.5% by mass or more, while the upper limit thereof is more preferably 10% by mass or less.

The amount E' of nonionic surfactant based on 100% by mass of surfactants in the puncture sealant is preferably 30% by mass or more, and more preferably 60% by mass or more.

The puncture sealant of the present invention may further contain other ingredients as long as the effects of the present invention are not inhibited.

The puncture sealant of the present invention preferably has a thixotropic index (TI) of 1.5 or more as measured at a low rotational speed of 6 rpm and a high rotational speed of 60 rpm. The thixotropic index (TI) values, which are indices of thixotropy, are determined in accordance with the method for measuring TI set forth in Test Methods for Liquid Unsaturated Polyester Resins (JIS K 6901), and are defined as a ratio of the viscosity measured at a low rotational speed of 6 rpm to the viscosity measured at a high rotational speed of 60 rpm [(viscosity at 6 rpm)/(viscosity at 60 rpm)].

The puncture sealant having a TI value of 1.5 or more is less viscous during injection, and shows sufficient sealing performance after injection. The TI value is preferably 2.0 or more. The TI value in the present invention can be determined, for example, by measuring the viscosity with a B-type viscometer equipped with a No. 4 measuring rotor at rotational speeds of the measuring rotor of 6 rpm and 60 rpm.

The puncture sealant preferably has a viscosity at 20° C. of 200 cps or less. The puncture sealant having a viscosity of 200 cps or less is less viscous during injection, and shows sufficient sealing performance after injection. The viscosity is more preferably 70 to 200 cps, still more preferably 100 to 200 cps, and particularly preferably 150 to 200 cps. The viscosity values are determined by measuring the viscosity at a measurement temperature of 20° C. with a B-type viscometer equipped with a No. 4 measuring rotor (spindle) at a rotational speed of the measuring rotor of 6 rpm.

The puncture sealant of the present invention can be prepared by a conventional method. Specifically, the puncture sealant can be prepared, for example, by mixing the foregoing components and the like by a known method.

EXAMPLES

The present invention will be specifically described by reference to, but not limited to, examples.

Preparation Example

A bacterial proteolytic enzyme was added to field latex (solids content: 30% by mass) and left to stand at 40° C. for 24 hours to give a proteolytically degraded field latex. The field latex was purified with a rotary flat membrane separation system in accordance with the method described in JP-B 3350593 and concentrated until the solids content reached 60% by mass, thereby providing a deproteinized natural rubber latex.

Examples and Comparative Examples

Puncture sealants were prepared from a commercially available natural rubber latex (Malaysian HA-type natural rubber latex, rubber solids content: 60% by mass), the prepared deproteinized natural rubber latex, or a synthetic rubber latex (SBR latex (LX112) produced by Zeon Corporation, solids content: 50% by mass) according to the formulations shown in Tables 1 to 3.

The following tackifier, thixotropy-imparting agent, and nonionic surfactant were used.

Tackifier: Terpene resin emulsion (solids content: about 50% by mass)

Thixotropy-Imparting Agent:

(1) Ammonia-stabilized SNOWTEX N (produced by Nissan Chemical Industries, Ltd., $SiO_2$: 20% by mass, average particle size: 10 to 20 nm)

(2) SN-THICKENER 636 (produced by Sun Nopco Limited, modified polyacrylic type, solids content: 30% by mass)

EMULGEN 420: Polyoxyethylene oleyl ether (nonionic surfactant of formula (2) wherein $R^2$=oleyl; x=20; and y=0, HLB value=13.6, produced by Kao Corporation)

The prepared puncture sealants were evaluated for viscosity, puncture sealing performance, injectability, seal retention performance, and storage properties (storage stability) by the methods described below. Tables 1 to 3 show the results.

(1) Viscosity (at 20° C.):

The viscosity of each puncture sealant was measured at 20° C. with a B-type viscometer (Brookfield viscometer, "DV-E digital viscometer" produced by Brookfield Engineering) in accordance with the method for measuring TI set forth in Test Methods for Liquid Unsaturated Polyester Resins (JIS K 6901). The type and properties of the Brookfield viscometer used are as follows: Type I; B-type (BM); rotational speed: 6 rpm and 60 rpm; No. 4 spindle. The viscosities at 6 rpm and 60 rpm and the TI value were measured or calculated.

(2) Puncture Sealing Performance (Initial Sealing Performance):

A puncture hole was made in a tire of size 185/65R14 using a nail of 4.0 mm in diameter. After removal of the nail, 500 ml of a puncture sealant was injected into the tire and air pressure was applied up to 200 kPa. Thereafter, the tire was rotated under a load of 3.5 kN on a drum, and the time until the puncture hole was sealed was determined by measuring the amount of air leakage, and expressed as an index on a scale of 1-5, with 3 being given to a conventional product. A higher index indicates better puncture sealing performance.

(3) Injectability:

A puncture sealant was injected into a tire with an integrated puncture repair system at a temperature of 20° C. After the injection of the puncture sealant, injectability was evaluated by measuring the increase in tire pressure. The evaluation results are expressed on a 3-point scale: "Good" (the pressure was increased to a predetermined level (200 MPa)), "Moderate" (the pressure was increased to 100 MPa or higher, but this pressure increase then stopped before reaching the predetermined level), and "Poor" (the pressure increase did not even reach 100 MPa).

(4) Seal Retention Performance:

The tire mentioned above was also checked for air leakage from the puncture hole during 100 km of running after the sealing. The results are rated on a 2-point scale: "Good" (no air leakage occurred) and "Poor" (air leakage occurred).

(5) Storage Properties (Storage Stability):

After the prepared puncture sealants were left to stand for 10 days at a temperature of 70° C., the changes in state of the puncture sealants were visually evaluated on a 3-point scale: "Good" (remained liquid or changed to be slightly creamy), "Moderate" (changed to be creamy), and "Poor" (solidified).

TABLE 1

|  | Example 1 | Example 2 | Example 3 | Example 4 | Comparative Example 1 |
|---|---|---|---|---|---|
| Commercially available natural rubber latex | 55 | 55 | 55 | 55 | 55 |
| (Solids content: 60% by mass) | (33) | (33) | (33) | (33) | (33) |
| Tackifier | 15 | 15 | 15 | 15 | 15 |
| (Solids content: 50% by mass) | (7.5) | (7.5) | (7.5) | (7.5) | (7.5) |
| Propylene glycol | 30 | 30 | 30 | 30 | 30 |
| SNOWTEX N (Solids content: 20% by mass) | 5 | 10 | — | — | — |

TABLE 1-continued

|  |  | Example 1 | Example 2 | Example 3 | Example 4 | Comparative Example 1 |
|---|---|---|---|---|---|---|
| SN THICKENER 636 (20% by mass aqueous solution) | | — | — | 5 | 10 | — |
| EMULGEN 420 | | 1 | 1 | 1 | 1 | 1 |
| Results | Viscosity (cps) at 6 rpm and 20° C. | 80 | 125 | 95 | 140 | 50 |
| | Viscosity (cps) at 60 rpm and 20° C. | 48 | 52 | 46 | 49 | 47 |
| | TI [(Viscosity (cps) at 6 rpm)/(Viscosity (cps) at 60 rpm)] | 1.67 | 2.40 | 2.07 | 2.86 | 1.07 |
| | Puncture sealing performance | 5 | 5 | 5 | 5 | 3 |
| | Injectability | Good | Good | Good | Good | Good |
| | Seal retention performance | Good | Good | Good | Good | Good |
| | Storage properties | Good | Good | Good | Good | Good |

TABLE 2

|  |  | Example 5 | Example 6 | Example 7 | Example 8 | Comparative Example 2 |
|---|---|---|---|---|---|---|
| Deproteinized natural rubber latex | | 55 | 55 | 55 | 55 | 55 |
| (Solids content: 60% by mass) | | (33) | (33) | (33) | (33) | (33) |
| Tackifier | | 15 | 15 | 15 | 15 | 15 |
| (Solids content: 50% by mass) | | (7.5) | (7.5) | (7.5) | (7.5) | (7.5) |
| Propylene glycol | | 30 | 30 | 30 | 30 | 30 |
| SNOWTEX N (Solids content: 20% by mass) | | 5 | 10 | — | — | — |
| SN THICKENER 636 (20% by mass aqueous solution) | | — | — | 5 | 10 | — |
| EMULGEN 420 | | 1 | 1 | 1 | 1 | 1 |
| Results | Viscosity (cps) at 6 rpm and 20° C. | 85 | 115 | 100 | 135 | 50 |
| | Viscosity (cps) at 60 rpm and 20° C. | 49 | 54 | 48 | 49 | 48 |
| | TI [(Viscosity (cps) at 6 rpm)/(Viscosity (cps) at 60 rpm)] | 1.73 | 2.13 | 2.08 | 2.76 | 1.04 |
| | Puncture sealing performance | 5 | 5 | 5 | 5 | 3 |
| | Injectability | Good | Good | Good | Good | Good |
| | Seal retention performance | Good | Good | Good | Good | Good |
| | Storage properties | Good | Good | Good | Good | Good |

TABLE 3

|  |  | Example 9 | Example 10 | Comparative Example 3 |
|---|---|---|---|---|
| Synthetic rubber latex | | 50 | 50 | 50 |
| (rubber solids content) | | (25) | (25) | (25) |
| Tackifier | | 15 | 15 | 15 |
| (Solids content) | | (7.5) | (7.5) | (7.5) |
| Propylene glycol | | 30 | 30 | 30 |
| SNOWTEX N (Solids content: 20% by mass) | | 10 | — | — |
| SN THICKENER 636 (20% by mass aqueous solution) | | — | 10 | — |
| EMULGEN 420 | | 1 | 1 | 1 |
| Results | Viscosity (cps) at 6 rpm and 20° C. | 110 | 120 | 45 |
| | Viscosity (cps) at 60 rpm and 20° C. | 49 | 48 | 43 |
| | TI [(Viscosity (cps) at 6 rpm)/(Viscosity (cps) at 60 rpm)] | 2.24 | 2.50 | 1.05 |
| | Puncture sealing performance | 5 | 5 | 3 |
| | Injectability | Good | Good | Good |
| | Seal retention performance | Good | Good | Good |
| | Storage properties | Good | Good | Good |

As shown in Table 1, Examples 1 to 4, in which a thixotropy-imparting agent was added to natural rubber latex, a tackifier, an antifreezing agent and the like, showed good seal retention performance while achieving both puncture sealing performance and injectability. Also as shown in Tables 2 and 3, the examples using deproteinized natural rubber latex or synthetic rubber latex instead of natural rubber latex exhibited the same effects.

The invention claimed is:
1. A puncture sealant, comprising:
 rubber latex,
 a tackifier,
 an antifreezing agent, and
 a thixotropy-imparting agent,
 wherein the thixotropy-imparting agent is at least one of a water-soluble polymer and inorganic colloidal particles, and
 wherein an amount of the thixotropy-imparting agent (solids) per 100% by mass of the puncture sealant is 100/106% by mass to 30% by mass.

2. The puncture sealant according to claim 1,
 wherein the puncture sealant has a thixotropic index (TI) of 1.5 or more as measured at a low rotational speed of 6 rpm and a high rotational speed of 60 rpm.

3. The puncture sealant according to claim 1, wherein the puncture sealant has a viscosity at 20° C. of 200 cps or lower.

4. The puncture sealant according to claim 2, wherein the puncture sealant has a viscosity at 20° C. of 200 cps or lower.

5. The puncture sealant according to claim 1, wherein an amount of the thixotropy-imparting agent (solids) per 100% by mass of the puncture sealant is 100/106% by mass to 300/106% by mass.

6. The puncture sealant according to claim 1, wherein the inorganic colloidal particles are colloidal silica.

7. The puncture sealant according to claim 1, wherein the inorganic colloidal particles have an average particle size of 3 to 100 nm.

8. The puncture sealant according to claim 1, wherein the water-soluble polymer is an acrylic resin.

9. The puncture sealant according to claim 1, wherein the puncture sealant further contains a surfactant.

10. The puncture sealant according to claim 9, wherein an amount of the surfactant is 100/111% by mass to 12% by mass per 100% by mass of the puncture sealant.

* * * * *